(12) United States Patent
Weihrauch (10) Patent No.: US 6,685,376 B2
(45) Date of Patent: Feb. 3, 2004

(54) CLEANING OR APPLICATION DEVICE COMPRISING A SPONGE BODY, AND METHOD FOR PRODUCING THE SAME

(75) Inventor: Georg Weihrauch, Wald-Michelbach (DE)

(73) Assignee: Coronet-Werke GmbH, Wald-Michelbach (DE)

( * ) Notice: Subject to any disclaimer, the term of this patent is extended or adjusted under 35 U.S.C. 154(b) by 0 days.

(21) Appl. No.: 10/204,290

(22) PCT Filed: Feb. 21, 2001

(86) PCT No.: PCT/EP01/01954

§ 371 (c)(1),
(2), (4) Date: Aug. 20, 2002

(87) PCT Pub. No.: WO01/66330

PCT Pub. Date: Sep. 13, 2001

(65) Prior Publication Data

US 2003/0077106 A1 Apr. 24, 2003

(30) Foreign Application Priority Data

Mar. 7, 2000 (DE) .......................................... 100 10 508

(51) Int. Cl.⁷ ................................................ B65C 21/00
(52) U.S. Cl. ...................... 401/196; 401/201; 15/244.1
(58) Field of Search ................................. 401/196, 201, 401/202; 15/244.1, 244.3, 244.4

(56) References Cited

U.S. PATENT DOCUMENTS

| 2,588,773 | A | | 3/1952 | Smith | |
|---|---|---|---|---|---|
| 2,722,719 | A | | 11/1955 | Altstadter | |
| 3,570,036 | A | | 3/1971 | Gilchrist | |
| 3,944,704 | A | | 3/1976 | Dirks | |
| 4,119,583 | A | * | 10/1978 | Filip et al. ................... | 521/103 |
| 4,249,517 | A | * | 2/1981 | Schroeder et al. ........... | 126/661 |
| 4,409,755 | A | * | 10/1983 | Maddock ..................... | 47/1.5 |
| 4,421,526 | A | | 12/1983 | Strickman et al. | |
| 4,475,836 | A | * | 10/1984 | Colognori .................... | 401/201 |
| 4,615,066 | A | * | 10/1986 | Colognori .................... | 15/244.1 |
| 4,824,070 | A | * | 4/1989 | Mizuno et al. ............... | 249/93 |
| 5,554,659 | A | * | 9/1996 | Rosenblatt .................... | 521/51 |
| 5,704,723 | A | | 1/1998 | Salisian | |
| 5,791,008 | A | * | 8/1998 | Crabtree ...................... | 15/244.1 |

FOREIGN PATENT DOCUMENTS

| AT | 2 26 412 | 3/1963 |
|---|---|---|
| CH | 3 00 877 | 8/1954 |
| DE | PS 1 60 450 | 5/1905 |
| DE | 505 127 | 7/1930 |
| DE | PS 5 76 046 | 4/1933 |
| DE | GM 16 95 146 | 3/1955 |
| DE | GM 17 55 549 | 11/1957 |
| DE | GM 69 12 922 | 8/1969 |
| DE | 704 48 35 | 5/1971 |
| DE | 26 02 514 | 7/1976 |
| DE | 81 18 394 | 6/1981 |
| DE | 30 09 587 | 9/1981 |
| DE | 35 13 651 | 11/1985 |
| DE | 196 22 782 | 12/1997 |
| EP | 0 141 863 | 5/1985 |
| GB | 2 141 373 | 12/1984 |

OTHER PUBLICATIONS

Vieweg, richard, Höchtlen, Aug., (Hrsg.): Kunststoff–Handbuch, vol. VII, Polyurethane, Carl Hanser Verlag, Munich 1966, S.463–476.

* cited by examiner

*Primary Examiner*—Gregory Huson
*Assistant Examiner*—Khoa D. Huynh
(74) *Attorney, Agent, or Firm*—Paul Vincent (57) ABSTRACT

The invention relates to a method for producing a cleaning or application sponge which is characterized by foaming a sponge body in a molding tool (11, 12) to the substantially final shape of the sponge. The outer surface of the sponge body has in at least some areas a solidified skin (13) that can be at least partially removed in a subsequent process step. The sponge body may also have a closed-cell structure that is partially revealed in a subsequent process step.

24 Claims, 8 Drawing Sheets

CLEANING OR APPLICATION DEVICE COMPRISING A SPONGE BODY, AND METHOD FOR PRODUCING THE SAME

Translation of PCT/EP01/01954 as filed on Feb. 21, 2001.

BACKGROUND OF THE INVENTION

The invention relates to a method for the manufacture of a cleaning or application sponge, as well as to a cleaning or application device, which is equipped with a corresponding sponge or sponge body.

For the manufacture of cleaning and application sponges, such as are now more particularly used in the home, it is known to initially produce a relatively large block from polyurethane foam, which is parallelepipedic or cubic. The sponge is then worked from this foam block by cutting and/or punching. If in addition gripping depressions are to be made in the sponge or if its edges are to be beveled, the sponge must undergo a subsequent cutting process. The known manufacturing method is disadvantageous in a number of respects.

Firstly the method is very complicated and therefore costly as a result of the numerous method steps to be successively performed. In addition, the foam blocks are not normally produced by sponge manufacturers and are instead bought in from third parties, so that they must firstly be transported to the sponge manufacturer. In order to reduce the very large transportation volume, it is known to compress the foam blocks, but there is still a relatively large transportation volume for a small transportation weight, so that the transportation of the foam blocks is not economical. In addition, the sponge manufacturer must have a large storage space for the foam blocks and this leads to complicated storage.

On punching and/or cutting out the sponges and in particular during their finishing, there is a very considerable material loss or waste, which is neither economical nor good for the environment. The cutting, punching and milling processes only allow very limited shape configurations and in particular it is not or only with great difficulty possible to form undercuts or subject designs, e.g. animal or human representations.

A significant disadvantage of a sponge worked from a foam block is that the pores on the sponge edges are cut open, which is linked with a stability loss of the sponge in these areas. However, during practical use of the sponge, its edges and corner areas are more particularly needed for cleaning or application purposes, so that the use characteristics of the known sponge are inadequate in this respect.

For many applications it is appropriate and necessary to bond the sponge on at least one side with a coating. For this purpose a blank of the coating to be bonded is produced and said coating is then applied by a flame bonding process. However, this procedure is very labor intensive and also not completely safe.

On of the important disadvantages of the known sponges is the uniform pore or cell structure over the entire sponge volume. If a sponge is wetted and used for cleaning purposes, then the moisture is not only forced in the direction of the article to be cleaned or otherwise treated, but also flows onto the fingers holding the sponge and the hand surface of the use supporting the sponge. This consequently does not allow a targeted use of the cleaning liquid or the medium to be applied.

The problem of the invention is to provide a method for the manufacture of a cleaning or application sponge with which, even in the case of a complicated design, manufacture can take place in an inexpensive and environmentally compatible manner. In addition, a cleaning or application device with a corresponding sponge body is to be provided.

SUMMARY OF THE INVENTION

With regards to the method this problem is solved in that the sponge body is foamed or expanded in a mould essentially to the final shape or form of the sponge and on the outer surface of the sponge body during said foaming or expansion process and at least in partial areas thereof, but in particular on the complete outer surface, a strengthened or hardened outer skin is produced.

Thus, during the foaming process the sponge body acquires the desired shape, so that little or no subsequent finishing is necessary. Compared with known sponge manufacture the total number of method steps is significantly reduced, so that the sponge can also be inexpensively manufactured. The aforementioned problem relating to the transportation and storage of the foam blocks can be completely avoided with the method according to the invention. As, according to the invention, the sponge is shaped by the cavity of the mould and not by finishing involving material removal, the material losses can be kept very small.

The formation of the hardened outer skin on the outer surface of the sponge body can be obtained in that the method parameters, e.g. the mould temperature, cooling, foam density, foaming pressure, etc., which are controlled by the composition of the plastics material, are adjusted in such a way that on the outer surface of the sponge body is formed the closed, hardened plastics material skin. The hardened outer skin increases the stability of the sponge body and in the areas of the latter used for product application the outer skin is subsequently at least zonally opened or removed, which can e.g. take place by milling, cutting, grinding, peeling, sand blasting or partial dissolving.

Preferably the interior of the sponge body has a closed-cell structure, which can be zonally opened in a following method step. In this way it is possible to leave certain areas of the sponge body in closed cell form, so that these areas on the one hand have an increased stability and on the other it is ensured that the liquid present during use in the sponge body does not pass out at these areas. Preferably the closed-cell foam is only opened in these sponge body areas, which are used for product application, which permits a targeted escape of liquid or medium to be applied from the sponge body.

The opening of a closed-cell foam structure is known per se and can e.g. take place by mechanical bursting using pressure, known as crushing.

The areas of the sponge body, which remain unopened and consequently have a higher strength, can serve as gripping portions for the user. In particular, the sponge body areas to be used for the direct or indirect retention of the sponge body on gripping parts, handles, sticks, etc. can remain closed-pored.

During the foaming process in the mould use is generally made of parting agents, which in the case of the method according to the invention can be removed without additional measures by opening the closed-cell structure on the surface or the opening of the outer skin.

Not only raising the density of the foam material, but also by a suitable temperature control in the foaming moulds, can increase the edge strength of the sponge body. If the foaming reaction takes place in a closed mould e.g. thermally maintained at 30 to 60° C. and more plastics material than necessary is filled into the mould cavity, accompanied by compression or compacting this material cross links to a harder structure with the denser outer skin, which continuously passes into a cellular core. Through an appropriate choice of the temperature and the material mixture introduction into the mould cavity, in this way it is possible to obtain planned foam structures and surface structures with high edge strengths.

If, in the aforementioned manner, on the sponge body are to be formed more stable holding or gripping portions or sealed areas, in said sponge body portions the outer skin is not opened.

As a suitable sponge body material flexible polyurethane foam has proved highly satisfactory and its foam density can be between 25 and 80 kg/m$^3$. It is in particular possible to use polyester-PUR foam.

According to a further development of the invention the foam body comprises several differently structured foam body portions. The foam body portions can be prefabricated and are then joined together by bonding or welding.

A preferred manufacturing possibility results from the fact that the mould cavity is subdivided by one or more partitions, particularly in the form of slides, into several chambers. A foam material can be filled into and reacted in each chamber. Prior to the end of the foaming reaction the partitions are removed, e.g. by pulling the sliders, so that the material in the individual chambers can be linked. The chambers can be completely separated from one another by the partitions, but it is e.g. also possible for the chambers, in predetermined portions, e.g. in the central area of the mould cavity, to be connected, so that in this area a connection or mixing of the two foam structures takes place in unhindered manner. However, in the outer circumferential area of the sponge body, due to the partitions located there, there is a clear demarcation between the individual structural areas. In the central area of the sponge body, which preferably represents most of the sponge body volume, there is consequently an intense linking of the two structures, whereas in a relatively small marginal or circumferential area there can be a precise demarcation of the two structures over a limited depth. The sponge body can also be formed from several layers with the same or a different extension.

According to a preferred further development of the invention in the sponge body is formed a storage chamber for a cleaning medium or a medium to be applied with at least one filling opening running to the outside of the sponge body. The storage chamber can contain the medium to be applied, which can be a liquid, dust, powder, tablets or capsules and when the sponge body is used the medium is supplied to the working or application surface of the sponge body, which is either brought about through the open-celled structure of the sponge body in said area and/or by additional application channels, which can e.g. be drilled. The inventive method of foaming the sponge body in the mould offers numerous possibilities for the design of the storage chamber in the form of a cavity introduced into the sponge body. If a prefabricated gripping part, more particularly made from plastic, is fitted to the sponge body, it can contain the storage chamber for the medium to be applied or can do so at least together with a surface of the sponge body. For this purpose the gripping part can have a filling opening through which the medium to be applied can be filled or refilled into the storage chamber. The filling opening can also be closed by a closure, which can be in the form of a shaped cover, stopper or similar closing element. In a preferred development the storage chamber for the medium to be applied is formed in the space between the sponge body and the mounted gripping part.

If a portion of the sponge body remains unopened for the formation of a holding portion, it can be externally grooved, profiled or structured, in order to make it easier for the user to grip the sponge body and guide it during use.

If a separate gripping part is fitted to the sponge body, the latter is fixed in the above indicated manner, more particularly to an unopened sponge body portion and for fixing purposes there is preferably a locking or bracing of the sponge body in the gripping part, so that the latter can continue to be used even when the sponge body is worn and can be provided with a new sponge body. The receptacle of the gripping part can either be completely filled by the sponge body, or it is possible within the gripping part above the sponge body to leave a free space, which can e.g. serve as a storage chamber for the medium to be applied in the manner described hereinbefore.

According to a further development of the invention an inner bag is embedded in the sponge body and is accessible from the outside of the latter. Said inner bag is more particularly constructed as a glove, e.g. made from rubber or plastic, so that a user can invert the glove over her hand and consequently carries a sponge body fitted to the hand and during use thereof she does not come into contact with the cleaning liquid or medium to be applied.

The mould foaming process according to the invention allows the formation of further elements on the sponge body. For example it is possible to shape a suspension loop on the sponge body, or it is also possible to integrate a closing plug for the storage chamber filling opening in captive manner in the sponge body. In addition, a gripping part can be joined to the sponge body, e.g. by means of a hinge joint and can be manufactured together therewith, so that after removing the gripping part from the mould it is merely necessary to swivel it into a position fixed on the sponge body.

The working or application surfaces of the sponge body can be structured. The surface structures can have both a cleaning or application function or can carry information or decorations. The structuring can be relatively flat and areal or can also be in pin or bristle-like form. The projecting surface areas can remain closed or can be opened by eliminating the outer skin. Further measures such as polishing, galvanizing or eroding the mould cavity enable the sponge body surface to be influenced.

The sponge body can be given an antimicrobial finish. For this purpose antimicrobial agents are introduced into the starting material to be foamed or into the mould cavity. The antimicrobial substances are in particular water-soluble substances such as xylite, chlorohexidine salts or cetyl pyridinium chloriol. A subsequent foam body finishing is also possible, in that it is impregnated with antimicrobial agents or the latter are added in liquid, pasty, pulverulent or solid form into the voids of the sponge body. These can be separate voids specifically provided for this purpose. However, it is also possible to add the antimicrobial agents to the cleaning agents, particularly in the form of liquid detergents. If the antimicrobial agents are fed into a void or cavity of the foam body with no or only a few opened walls, the agent continues to act over a long time period. This fundamentally also applies to cleaning and application media. The closed outer skin of the handling area helps to avoid the undesired escape and aids the targeted use of said agent.

This sponge body can be provided with several, separated chambers, which receive agents, which can react with one another on contact. As a result of the cellular structure of the sponge body and/or the pressing together or the sponge body during use, said agents are brought together. This permits a continuous dosing through the cell structure or a forced dosing resulting from the pressing effect on the sponge body.

The sponge body areas where the largely closed outer skin remains, can be provided with information and/or decorations by sand blasting, etching, printing, screen-printing, ink jet printing or laser application.

It can in particular be provided that the sponge body is zonally provided with a coating on its outer surface. This can in particular be brought about in that prior to the foaming of the sponge body said coating is placed in the mould. This leads to the important advantage that the bonding material can be inserted in part-surface or multipart manner and can be distributed over the handling, working or application surface of the sponge body. The bonding materials can be almost randomly freely selected as a result of the good adhesion of PU foams to all possible materials. They can in particular be abrasive sheets, cloths, extruded elastomer fabrics, e.g. having studs, pins or bristles or also silicone bristles. Corresponding inserts are particularly advantageous at corners and edges of the foam-molded sponge body. In the inserts or also directly on the sponge body it is also possible to apply abrasive materials. As a result of the foaming of the sponge body it is possible to embed thereon by foaming round articles made from materials without any affinity, and these can e.g. be suspension loops or metal rings.

A cleaning or application device according to the invention comprises a sponge body with the aforementioned structure and it is in particular provided that a gripping part is applied to the holding portion of the sponge body.

Further details and features of the invention can be gathered from the following description of embodiments with reference to the attached drawings, wherein show:

DESCRIPTION OF THE PREFERRED EMBODIMENT

Figure 1:
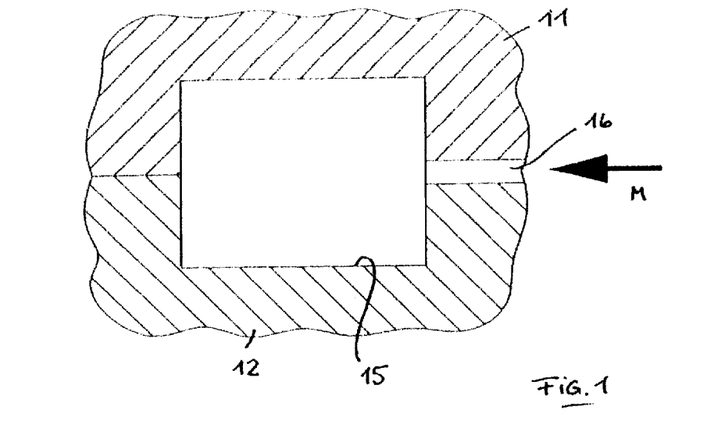
FIG. 1 A diagrammatic representation of a mould for performing the method according to the invention.
Figures 2, 4:
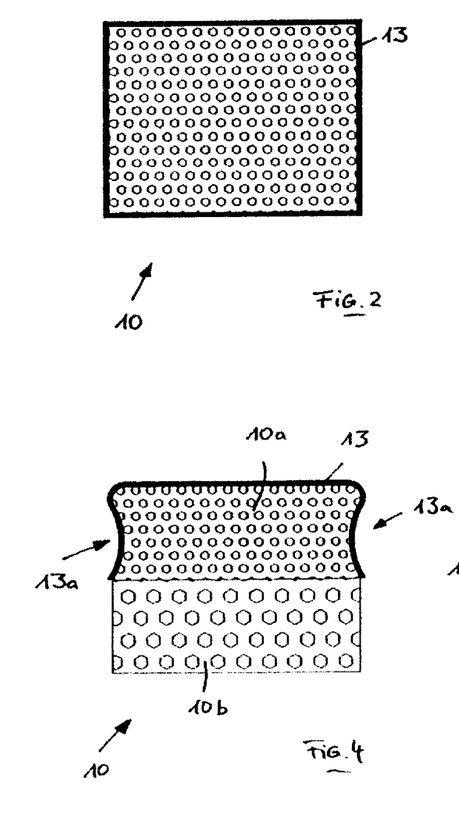
FIG. 2 A longitudinal section through a sponge body after foaming.
FIG. 4 A sponge body with an integrated gripping portion following further finishing.

FIG. 1 diagrammatically shows a mould for the manufacture of a sponge body according to the method of the invention. The mould comprises two valves 11 and 12 defining between them a cavity 15. By means of a supply channel 16 a foaming or expanding plastics material, which can in particular be flexible polyurethane foam, is introduced into the mould cavity 15 and foamed there, as indicated by arrow M. The size and shape of the mould cavity 15 essentially corresponds to the final shape or form of the sponge body. After opening the mould a sponge body 10 is obtained with an internal, uniform closed-cell structure and a continuous, closed, hardened or strengthened outer skin 13, which is relatively stable and which by an appropriate setting of the method parameters during the foaming process can be formed on the outside of the sponge body 10, as shown in FIG. 2. The outer skin 13 can be zonally broken away or opened, so that the sponge body 10 shown in FIG. 3 with a continuous, internal, closed-cell area is obtained, whose lower region is freed from the outer skin 13. The remaining, solid outer skin 13 can be used as a stable gripping portion for the user or for the fitting of a separate gripping part.

Figure 3:
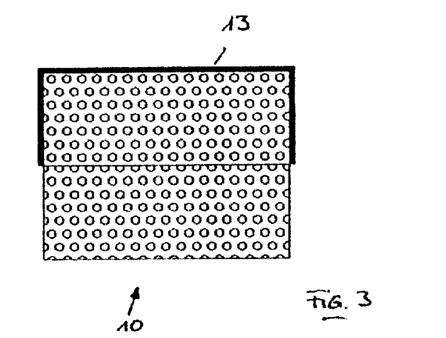
FIG. 3 A sponge body after finishing.
Figure 5:
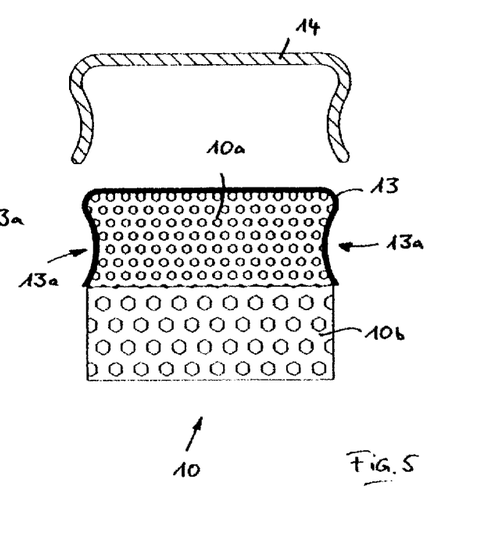
FIG. 5 A sponge body with a separate gripping part prior to the fitting of the latter.
Figure 6:
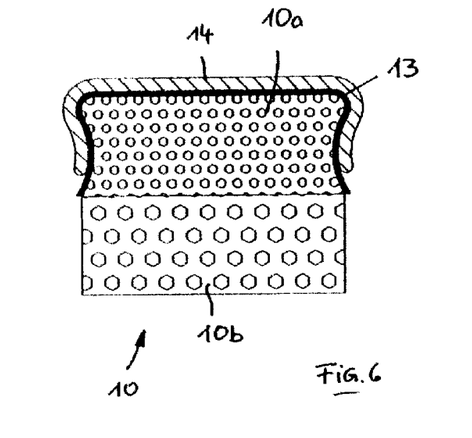
FIG. 6 The sponge body according to FIG. 5 with fitter gripping part.
Figure 7:
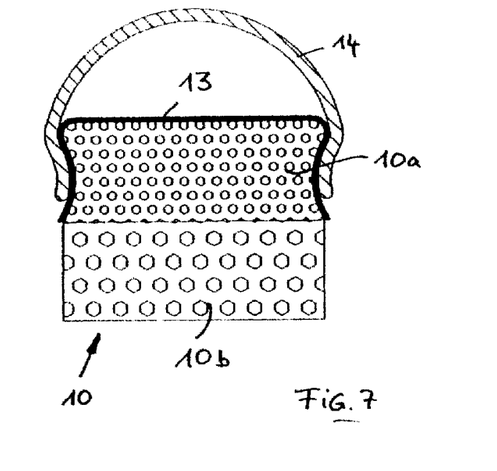
FIG. 7 A sponge body with gripping part in an alternative construction.

The sponge body 10 according to FIG. 4 differs from that according to FIG. 3 in that the sponge body 10 has in its lower area 10b a subsequently opened cell structure, whereas the upper area 10a remains in closed-cell form and is surrounded by the solid outer skin 13. The closed-cell area 10a has a greater spatial stability than the open-celled area 10b and can serve as a gripping or holding portion for a user. Additionally in the lateral edges of the upper area are shaped inwardly directed recesses 13a, which facilitate the gripping of the sponge body 10 or can serve for a positive fitting of a separate gripping part 14, as shown in FIG. 5. The hood-like, downwardly open, separate gripping part 14 is mounted from above on the hardend sponge body portion in such a way that its side parts look in the recesses 13a accompanied by elastic deformation, so that the gripping part 14 is firmly held on the sponge body 10. The fitted state of the gripping part 14 is shown in FIG. 6 and the sponge body completely fills the interior of the gripping part 14. However, it is alternatively also possible for the interior of the gripping part 14 to be only partly filled by the sponge body 10, as shown in FIG. 7.

Figure 8:
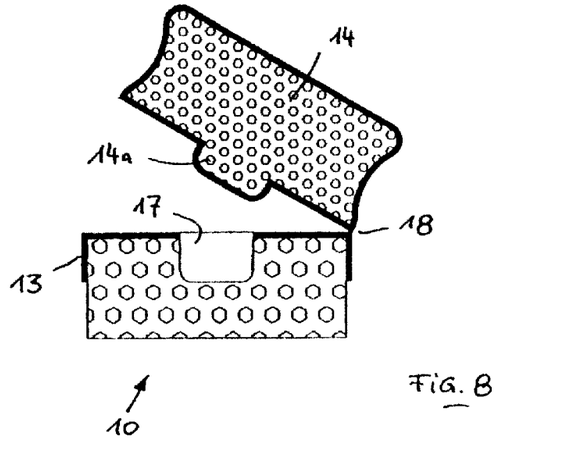
FIG. 8 A sponge body with integrated gripping part.
Figure 9:
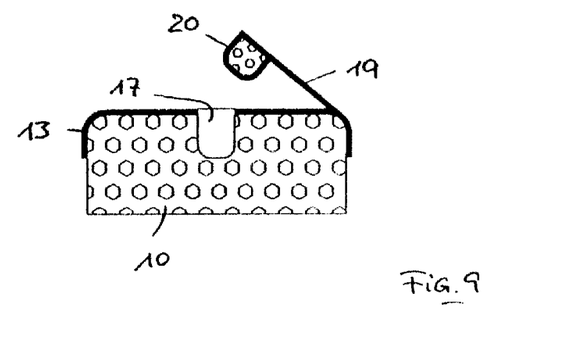
FIG. 9 A sponge body with integrated closure part.

FIG. 8 shows a sponge body 10 with a portion opened in the lower region or which is freed from the outer skin, whereas in the upper region the outer skin 13 remains. On the top of the sponge body 10 is formed a recess, which constitutes a storage chamber 17 for a cleaning agent or a medium to be applied. A gripping part 14 is shaped in one piece on the sponge body 10 by means of a hinge joint 18 and it is completely surrounded by a hardened outer skin and on its surface facing the top of the sponge body 10 has a stopper-like projection 14a, which can seal the storage chamber 17 from above if the gripping part 14 is pivoted round the hinge joint 18 and comes to rest on the top of the sponge body 10. In the alternative construction shown in FIG. 9 on the sponge body 10 is shaped a closing plug 20, which is connected to the sponge body by means of a connecting web 19 and can close the top filling opening of the storage chamber 17.

Figure 10:
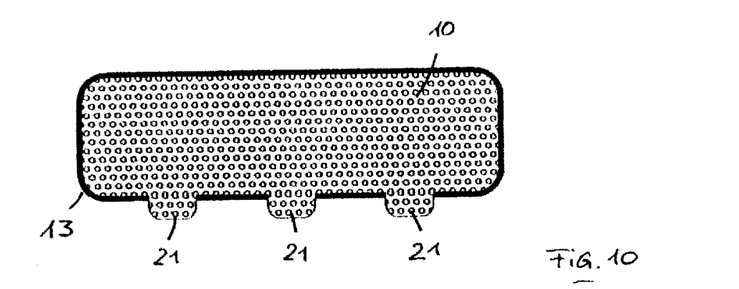
FIG. 10 A sponge body with structured working surface according to a first embodiment.
Figure 11:
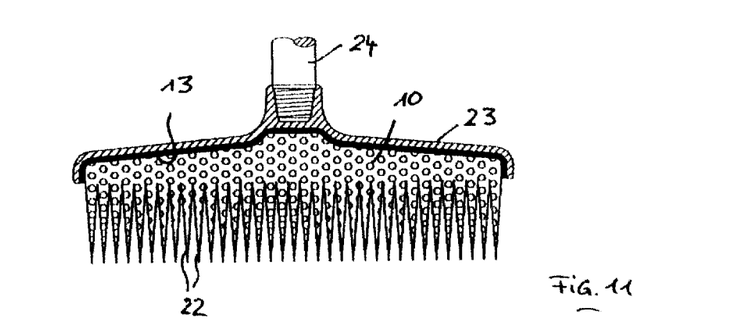
FIG. 11 A sponge body with structured surface according to an alternative embodiment.
Figure 12:
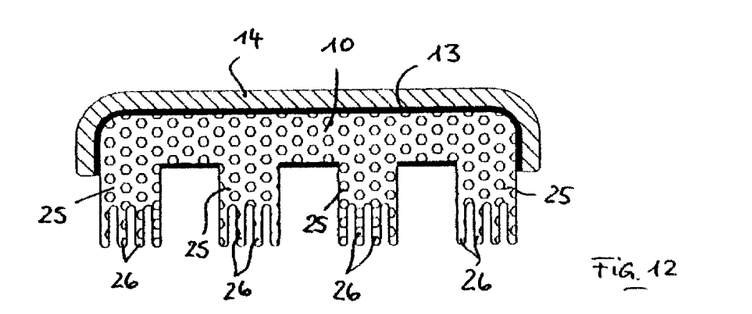
FIG. 12 A sponge body with structured surface according to another embodiment.

FIGS. 10 to 12 show sponge bodies with a structured surface. According to FIG. 10 on its lower working surface the sponge body 10 has several projecting, surface areas 21 with a relatively limited height. When the sponge body 10 is removed from the mould, it is completely surrounded with a solid outer skin 13. The latter is only opened in the vicinity of the projecting areas 21, whereas the portions of the lower working surface between the areas 21 remain closed by the outer skin 13.

FIG. 11 shows a broom formed from a sponge body. For this purpose the sponge body is provided on its underside with a plurality of freely downwardly projecting fingers 22, which are freed from the outer skin 13. In the upper area where the outer skin 13 still remains, the sponge body 10 is enveloped by a holding part 23, which is connected to a broom handle 24.

The sponge body according to FIG. 12 has on its underside downwardly projecting projections 25, which are provided on their underside with bristle-like fingers 26. The projections 25, including the fingers 26, are freed from the stable outer skin 13. In the upper area of the sponge body 10 the latter is embraced by a separate, stiffening gripping part 14.

Figure 13:
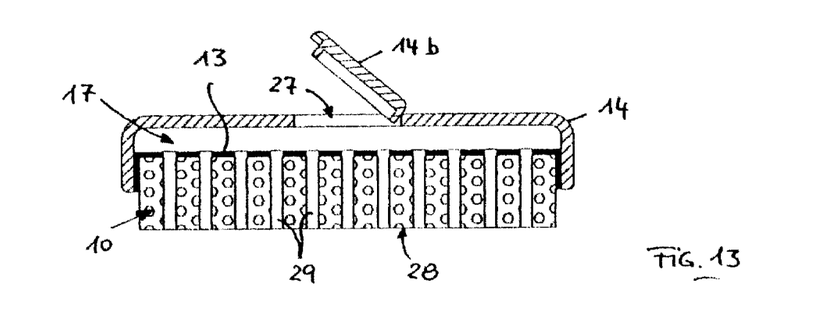
FIG. 13 A sponge body with storage chamber for the medium to be applied.

FIG. 13 shows a sponge body 10 carrying in its upper area a prefabricated, cap-like gripping part 14 and between the top of the sponge body 10 and the gripping part 14, i.e. in its interior, is formed a storage chamber 17 for a medium to be applied. The gripping part 14 has a pivotable flap 14b, which is shaped in one piece and which makes it possible to open or close, as desired, a filling opening 27 of the storage chamber 17.

In the indicated manner the lower area of the sponge body 10 is opened and freed from the outer skin. Between the storage chamber 17 and the opposite application surface 28 of the sponge body 10 extend a plurality of channels 29. The channels 29 can be dimensioned and oriented in such a way that powder or dust-like substances can be supplied from the storage chamber 17 to the application surface 28, followed by the application thereof. Except for the issuing openings of the channels 29, the top of the sponge body over which the gripping part 14 engages is not freed from the outer skin 13 for stability reasons. If the user applies pressure to the sponge body 10, this leads to a whirling up of the powder in the storage chamber 17 and consequently to the loosening thereof.

Figure 14:
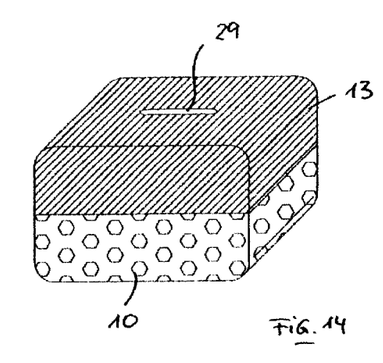
FIG. 14 A sponge body with a self-sealing storage chamber closure.
Figure 15:
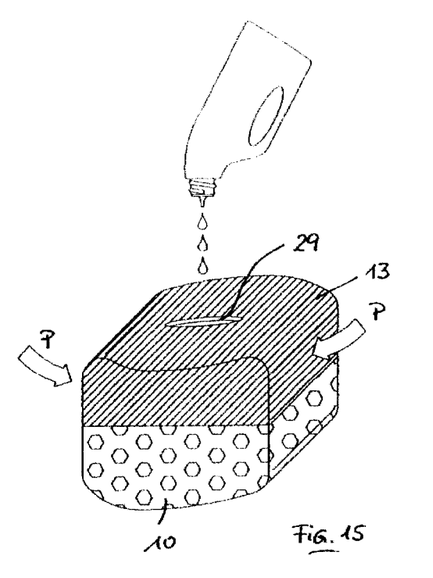
FIG. 15 The sponge body of FIG. 14 in the open position.

FIG. 14 shows a sponge body 10, in which upper area the stable outer skin 13 has been left behind. On the top of the sponge body is formed a gap or slit 29, which can optionally be connected with a storage chamber for a medium to be applied formed in not shown manner in the interior of the sponge body 10. If a storage chamber is formed, it is accessible from the outside via the slit 29. In the normal state of the sponge body, the slit 29 on the surface of the sponge body 10 is closed as a result of the natural elasticity of the foam material. In order to be able to fill or refill a medium into the slit 29 or storage chamber, the user must pressurize the sponge body 10 from opposite sides, as indicated by the arrows P in FIG. 15. As a result the sponge body 10 is deformed in such a way that the slit 29 opens and it is possible to fill the medium, as illustrated in FIG. 15.

Figure 16:
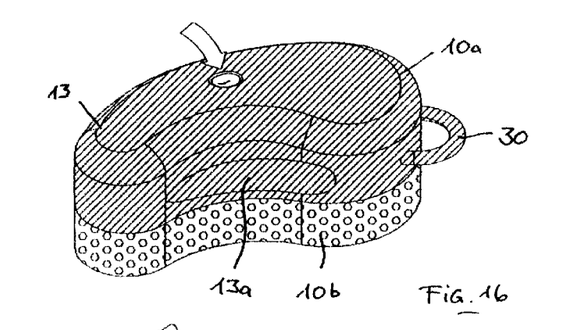
FIG. 16 A sponge body with integrated suspension ring.
Figure 17:
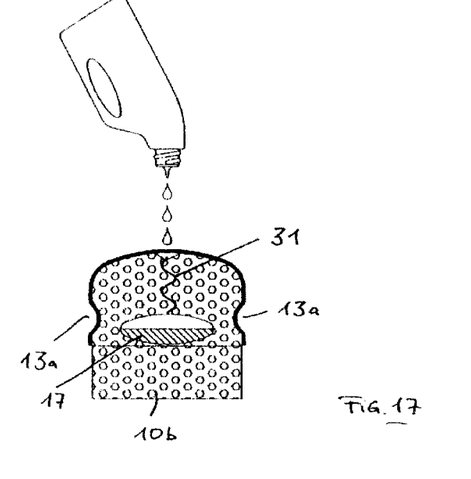
FIG. 17 A cross-section through the sponge body of FIG. 16.

FIG. 16 shows a kidney-shaped sponge body, which slightly tapers at one end. The lower portion 10b of the sponge body is opened, whereas the upper portion 10a remains unopened and carries a stabilizing outer skin 13. Gripping depressions 13a are shaped in the sides of the sponge body 10. A hook 30 is shaped in a one-piece manner on one end and is only foamed to a limited extent, so that it has an increased stability. As shown in FIG. 17, the interior of the sponge body 10 has a storage chamber 17 for cleaning agents, detergents or a medium to be applied, which by means of a labyrinth channel 31, which simultaneously serves as a closure, is connected to the top of the sponge body.

Figure 18:
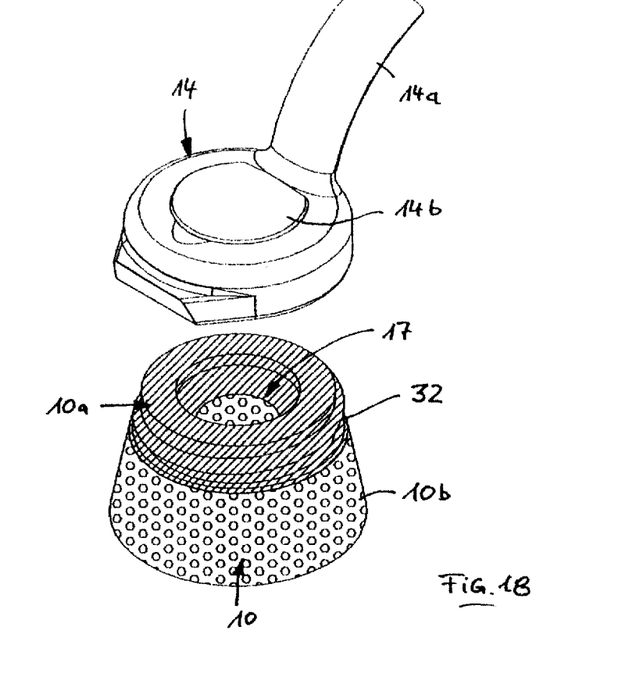
FIG. 18 A sponge body with fittable gripping part and integrated storage chamber.
Figure 19:
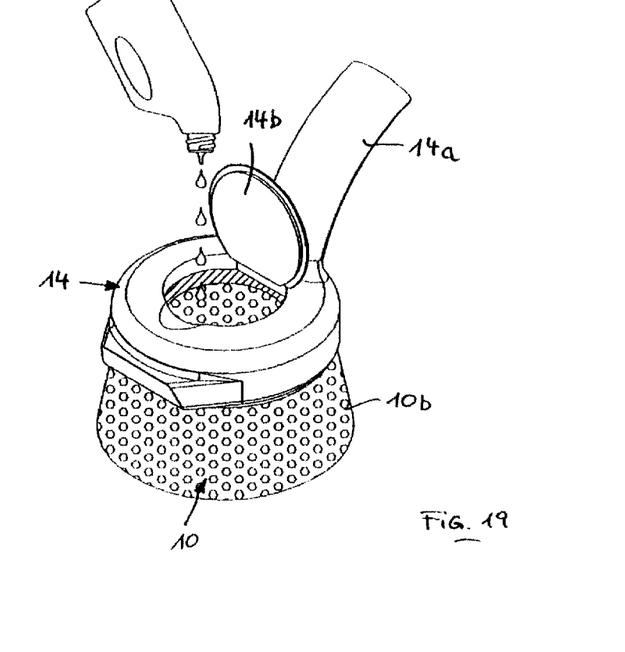
FIG. 19 The cleaning device according to FIG. 18 with an open storage chamber.

FIG. 18 shows a sponge body 10, which is open in its lower area 10b and has on its top a shaped in depression for forming a storage chamber 17. In the upper, unopened area 10a of the sponge body is provided a circumferential locking projection 32 with a corresponding locking depression, so that a separately prefabricated gripping part 14 with shaped on handle 14a can be locked on the top of the sponge body 10 and covers in lid-like manner the top of the sponge body and consequently the storage chamber 17. The gripping part 14 has a shaped on flap 14b, which can be opened in accordance with FIG. 19, so that a detergent can be filled from above into the storage chamber 17 of the sponge body 10.

Figure 20:
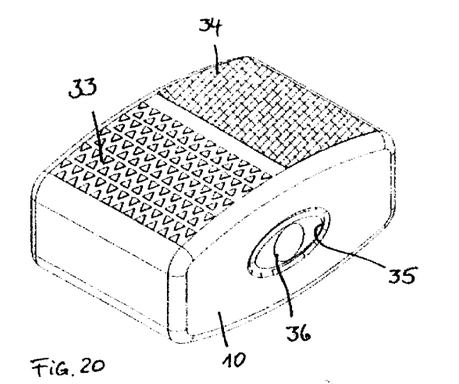
FIG. 20 A sponge body with surface bonding.

In the embodiment shown in FIG. 20 the outside of the sponge body 10 is lined or bonded with coatings, which are inserted in the mould cavity prior to the foaming process. In the embodiment shown both a slightly abrasive coating 33 with a limited surface structure and also a highly abrasive coating 34 are applied. Alternatively or additionally the sponge body 10 can be flocked. The sponge body 10 according to FIG. 20 is also characterized in that in its central area is formed an introduction opening 35 into which can be shoved a storage cartridge 36, which contains a cleaning agent, detergent or medium to be applied. If the cartridge 36 is empty, a new cartridge either replaces it or it is discharged from the sponge body 10 and refilled, as shown in FIG. 21.

Figures 21, 22, 23, 24:
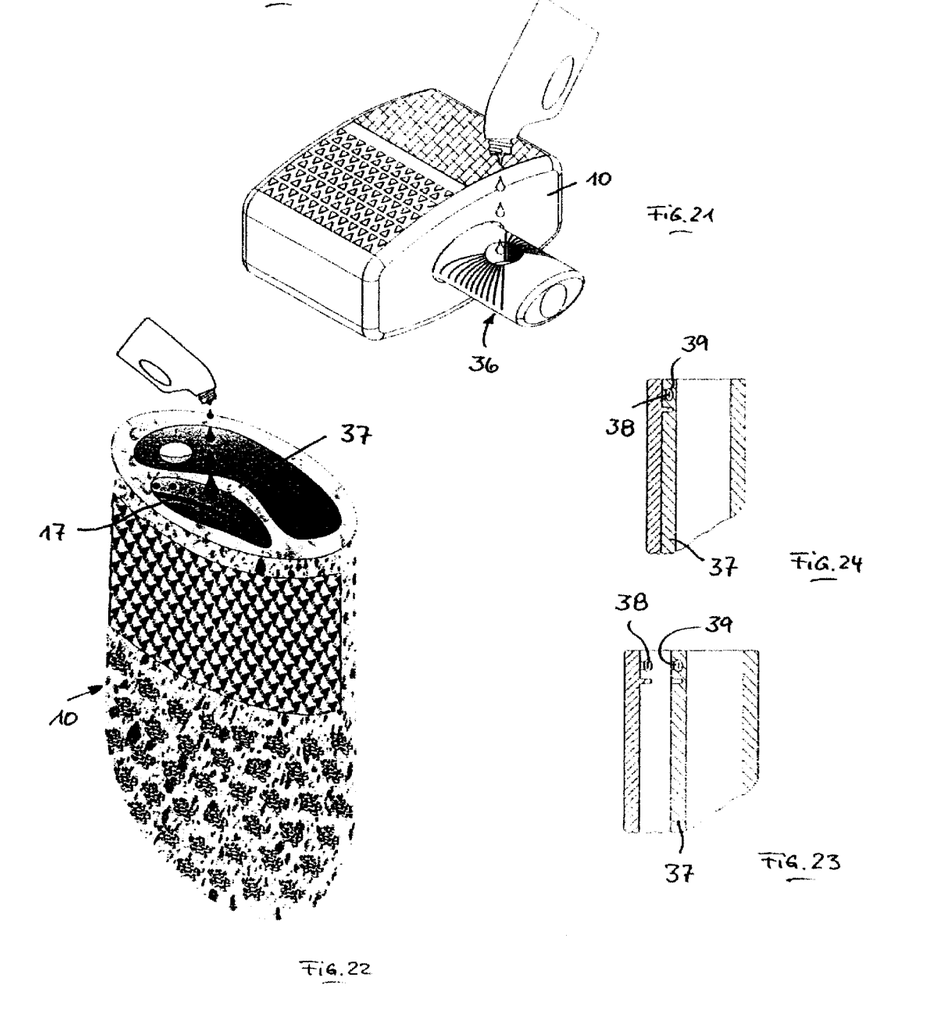
FIG. 21 The sponge body of FIG. 20 with rechargeable cartridge.
FIG. 22 A glove-like sponge body with lateral storage chamber.
FIG. 23 The closure of the storage chamber of FIG. 22 in the open position.
FIG. 24 The closure according to FIG. 23 in the closed position.

According to FIG. 22 the sponge body 10 has a bag-like shape and can be used as a cleaning glove. On one side a partition 37 subdivides a storage chamber 17 into which the detergent can be filled. The storage chamber 17 can be closed at the upper end of the bag-like sponge body, in that projections 38 formed on the side wall of the sponge body are pressed into corresponding receptacles 39 of the partition 37, accompanied by elastic deformation and as shown in FIGS. 23 and 24.

Figure 25:
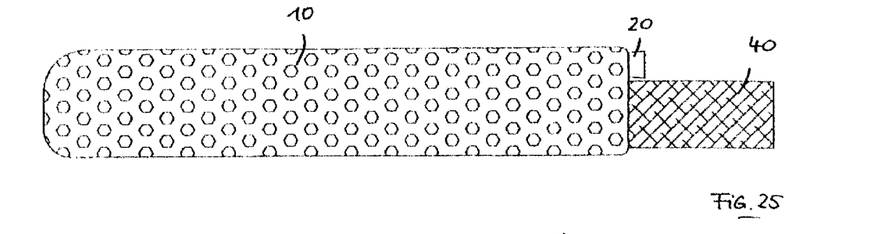
FIG. 25 A sponge body with embedded inner bag in the form of a glove.

To ensure that the user does not wet her hands when using the sponge body 10, in the latter can be embedded an inner bag shaped like a glove 40, which is accessible from the outside of the sponge body. Additionally in the sponge body is formed a storage chamber for detergent or cleaning agent which, by means of a plug 20, which is connected in one piece by means of a connecting web 19 to the sponge body 10, can as desired, be opened (FIG. 27) or closed (FIG. 26).

Figures 26, 27, 28:
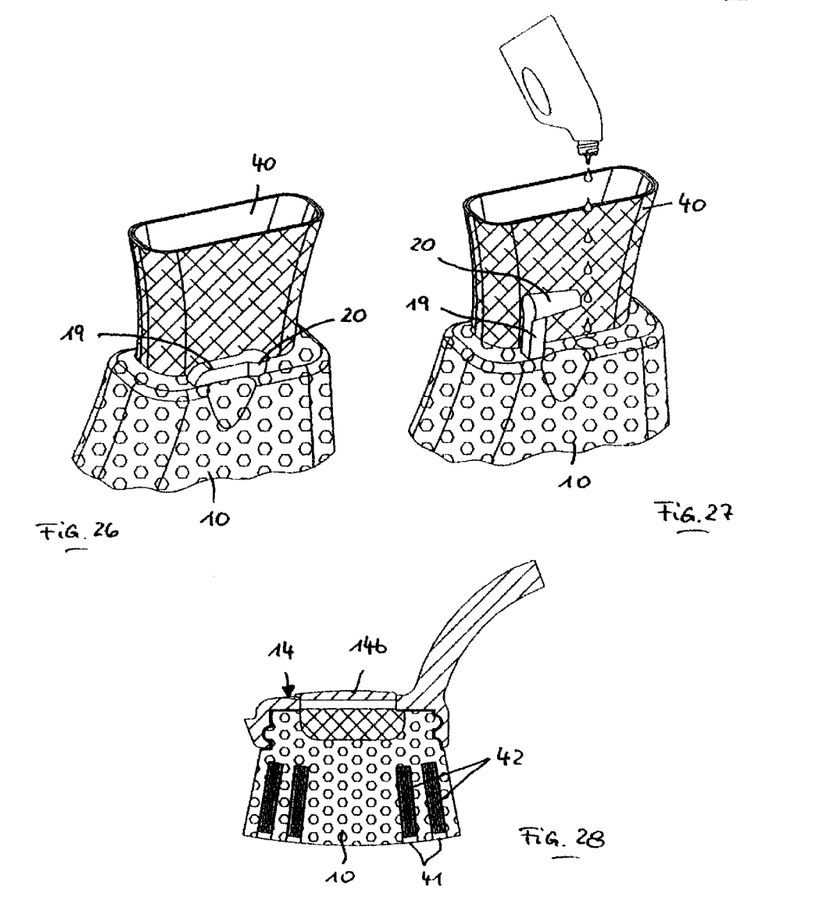
FIG. 26 The sponge body of FIG. 25 with shaped on closure part in the closed position.
FIG. 27 The closure part of FIG. 26 in the open position.
FIG. 28 A sponge body with integrated bristle bundles.

According to the construction of FIG. 28 on the underside, i.e. the working surface of the sponge body are formed recesses 41, in each of which is placed a bristle bundle 42, which is preferably fastened to the sponge body at its inner end. In the normal state of the sponge body the bristle bundles are completely received within the sponge body recesses 41. However, if the sponge body foam material is compressed during use, the bristle bundles project from the bottom of the sponge body, which intensifies a cleaning action.

Figure 29:
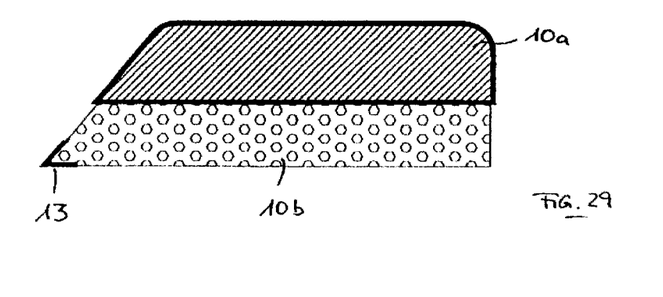
FIG. 29 A sponge body with reinforced corner areas.
Figure 30:
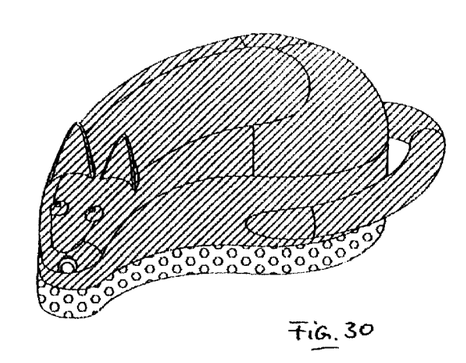
FIG. 30 shows a sponge body with a first subject design.
Figure 31:
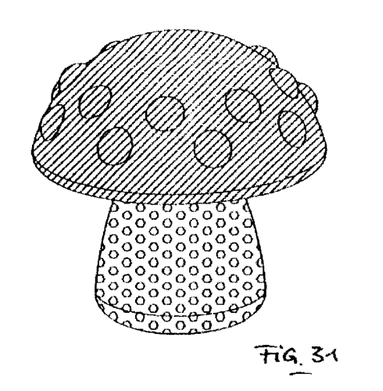
FIG. 31 shows a sponge body with a second subject design.
Figure 32:
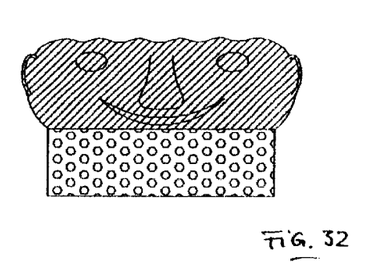
FIG. 32 shows a sponge body with a third subject design.
Figure 33:
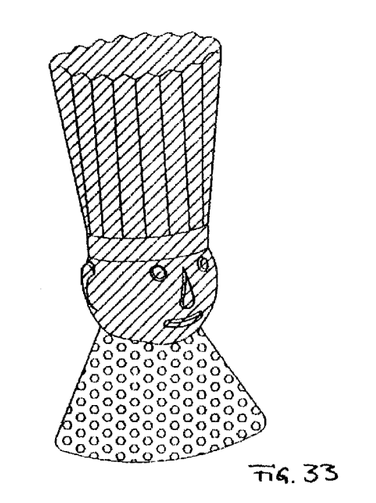
FIG. 33 shows a sponge body with a fourth subject design.
Figure 34:
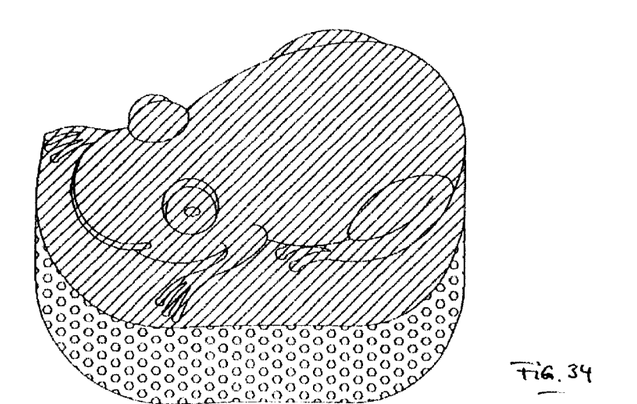
FIG. 34 shows a sponge body with a fifth subject design.

FIG. 29 shows a sponge body in which the stable outer skin 13 is left behind in the vicinity of a laterial edge of the lower working surface and consequently the edge is strengthened. Alternatively the edge area can be flocked or provided with an insert during the foaming of the sponge body.

FIGS. 30 to 34 show subject designs on a sponge body, as can be obtained with the foaming method according to the invention. These are both animal representations, such as the mouse shown in FIG. 30 or the frog shown in FIG. 34, whilst there can also be the configuration of a mushroom according to FIG. 31, a face for a cosmetic pad according to FIG. 32 or a saucepan brush showing a cook in FIG. 33.

What is claimed is:

1. A method for the manufacture of a cleaning or application sponge, the method comprising the steps of:
    a) foaming a sponge body in a mould to a substantially final sponge shape;
    b) defining a gripping portion of the sponge during step a), said gripping portion having a closed cell structure to form one of a handle and a handle section on which a handle can be introduced;
    c) forming a hardened outer skin in partial areas of an outer surface of the sponge body during step a);
    d) opening at least portions of said outer skin following step c).

2. The method of claim 1, wherein said sponge body has an inner, closed-cell structure and further comprising the step of at least partially opening said inner, closed-cell structure in a subsequent method step.

3. The method of claim 1, wherein said sponge body comprises flexible polyurethane foam.

4. The method of claim 1, wherein said sponge body has a foam density of 25 to 80 kg/m$^3$.

5. The method of claim 1, wherein said sponge body comprises several, differently structured sponge body portions.

6. The method of claim 5, further comprising the steps of prefabricating said sponge body portions and subsequently joining said sponge body portions together.

7. The method of claim 6, further comprising the steps of subdividing said mould into several chambers by means of partitions, introducing a different foam material into each of said several chambers, and removing said partitions prior to completion of step a) to link together said different foam materials.

8. The method of claim 7, wherein said partitions separate said chambers from one another in partial regions only.

9. The method of claim 1, further comprising forming a storage chamber or a slit in said sponge body for one of a cleaning medium and a medium to be applied, said storage chamber or slit having a filling opening passing to an outside of said sponge body.

10. The method of claim 1, further comprising embedding an inner bag in said sponge body, said inner bag being accessible from an outside of said sponge body.

11. The method of claim 10, wherein said inner bag is a glove.

12. The method of claim 1, wherein a hook is shaped on said sponge body.

13. The method of claim 1, wherein a gripping part is shaped on said sponge body.

14. The method of claim 1, further comprising surface-structuring a working surface of said sponge body.

15. The method of claim 1, further comprising coating portions of an outer surface of said sponge body.

16. The method of claim 15, wherein said coating is inserted into said mould prior to step a).

17. The method of claim 1, further comprising foaming around an object to embed said object in said sponge body.

18. The method of claim 17, wherein said object is at least one of a hanging loop, a metal eyelet, a pin, bristles, and a silicon bristle.

19. A cleaning or application device having the sponge body of claim 1, wherein a gripping part is disposed on said gripping portion of said sponge body.

20. The cleaning or application device of claim 19, wherein said gripping part defines a storage chamber for at least one of a cleaning medium and a medium to be applied, and further comprising means for introducing said medium from said storage chamber into said sponge body.

21. The cleaning or application device of claim 19, wherein said storage chamber is formed between said sponge body and said gripping part.

22. The cleaning or application device of claim 19, wherein said storage chamber is connected to an outside by means of a filling opening and further comprising a closure for closing said filling opening.

23. The cleaning or application device of claim 22, wherein said closure is integral with said foam body.

24. The cleaning or application device of claim 19, wherein said filling opening is constructed as a labyrinth channel.

* * * * *